(12) United States Patent
Ida et al.

(10) Patent No.: US 10,452,158 B2
(45) Date of Patent: Oct. 22, 2019

(54) INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventors: Kentaro Ida, Tokyo (JP); Kazuyuki Yamamoto, Kanagawa (JP); Shin Shiroma, Tokyo (JP); Kunihito Sawai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 46 days.

(21) Appl. No.: 15/527,772

(22) PCT Filed: Aug. 21, 2015

(86) PCT No.: PCT/JP2015/073486
§ 371 (c)(1),
(2) Date: May 18, 2017

(87) PCT Pub. No.: WO2016/084435
PCT Pub. Date: Jun. 2, 2016

(65) Prior Publication Data
US 2017/0322639 A1 Nov. 9, 2017

(30) Foreign Application Priority Data
Nov. 27, 2014 (JP) .................. 2014-239856

(51) Int. Cl.
*G06F 3/0346* (2013.01)
*G06F 3/0487* (2013.01)
(Continued)

(52) U.S. Cl.
CPC ............ *G06F 3/0346* (2013.01); *G06F 3/017* (2013.01); *G06F 3/033* (2013.01); *G06F 3/038* (2013.01);
(Continued)

(58) Field of Classification Search
None
See application file for complete search history.

(56) References Cited

U.S. PATENT DOCUMENTS

2006/0268008 A1* 11/2006 Idesawa ................ G06F 1/1601
345/623

FOREIGN PATENT DOCUMENTS

JP 2001-325069 A 11/2001
JP 2007-334870 A 12/2007
(Continued)

*Primary Examiner* — Gustavo Polo
(74) *Attorney, Agent, or Firm* — Chip Law Group

(57) ABSTRACT

To provide a technology capable of calculating a position of an image displayed on a screen more flexibly. Provided is an information processing device including: a first reception unit configured to receive a first signal from a first input device; a second reception unit configured to receive a second signal different from the first signal from a second input device; a calculation unit configured to calculate a position of an image to be displayed on a screen on the basis of the first or second signal; and a display control unit configured to display the image at the position. The calculation unit has a first mode in which the position of the image is calculated on the basis of the first signal and a second mode in which the position of the image is calculated on the basis of the second signal, and switches a mode from the first mode to the second mode when a user manipulation event is detected in the first mode.

20 Claims, 12 Drawing Sheets

(51) Int. Cl.
*G06F 3/01* (2006.01)
*G06F 3/033* (2013.01)
*G06F 3/038* (2013.01)
*G06F 3/042* (2006.01)
*G06F 3/0354* (2013.01)

(52) U.S. Cl.
CPC ........ *G06F 3/03542* (2013.01); *G06F 3/0425* (2013.01); *G06F 3/0487* (2013.01); *G06F 2203/0381* (2013.01)

(56) References Cited

FOREIGN PATENT DOCUMENTS

| | | |
|---|---|---|
| JP | 2010-086101 A | 4/2010 |
| JP | 2011-110136 A | 6/2011 |
| JP | 2015-014882 A | 1/2015 |
| WO | 2012/117652 A1 | 9/2012 |

\* cited by examiner

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2015/073486 filed on Aug. 21, 2015, which claims priority benefit of Japanese Patent Application No. JP 2014-239856 filed in the Japan Patent Office on Nov. 27, 2014. Each of the above-referenced applications is hereby incorporated herein by reference in its entirety.

TECHNICAL FIELD

The present disclosure relates to an information processing device, an information processing method, and an information processing system.

BACKGROUND ART

In recent years, there have been information processing devices that receive signals from input devices, calculate positions of images displayed on screens on the basis of the received signals, and display the images at the calculated positions (for example, see Patent Literature 1). According to these technologies, it is possible to display images at positions according to signals received from input devices.

CITATION LIST

Patent Literature

Patent Literature 1: Patent Application No. 2013-140856

DISCLOSURE OF INVENTION

Technical Problem

However, it is desirable to provide a technology capable of calculating a position of an image displayed on a screen more flexibly.

Solution to Problem

According to the present disclosure, there is provided an information processing device including: a first reception unit configured to receive a first signal from a first input device; a second reception unit configured to receive a second signal different from the first signal from a second input device; a calculation unit configured to calculate a position of an image to be displayed on a screen on the basis of the first or second signal; and a display control unit configured to display the image at the position. The calculation unit has a first mode in which the position of the image is calculated on the basis of the first signal and a second mode in which the position of the image is calculated on the basis of the second signal, and switches a mode from the first mode to the second mode when a user manipulation event is detected in the first mode.

According to the present disclosure, there is provided an information processing method including: receiving a first signal from a first input device; receiving a second signal different from the first signal from a second input device; calculating a position of an image to be displayed on a screen on the basis of the first or second signal; and displaying the image at the position. A first mode in which the position of the image is calculated on the basis of the first signal and a second mode in which the position of the image is calculated on the basis of the second signal are included, and a mode is switched from the first mode to the second mode when a user manipulation event is detected in the first mode.

According to the present disclosure, there is provided an information processing system including: a first input device configured to transmit a first signal; a second input device configured to transmit a second signal different from the first signal; and an information processing device configured to include a first reception unit that receives the first signal from the first input device, a second reception unit that receives the second signal from the second input device, a calculation unit that calculates a position of an image to be displayed on a screen on the basis of the first or second signal, and a display control unit that displays the image at the position. The calculation unit has a first mode in which the position of the image is calculated on the basis of the first signal and a second mode in which the position of the image is calculated on the basis of the second signal, and switches a mode from the first mode to the second mode when a user manipulation event is detected in the first mode.

Advantageous Effects of Invention

According to the present disclosure described above, it is possible to calculate a position of an image displayed on a screen more flexibly. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
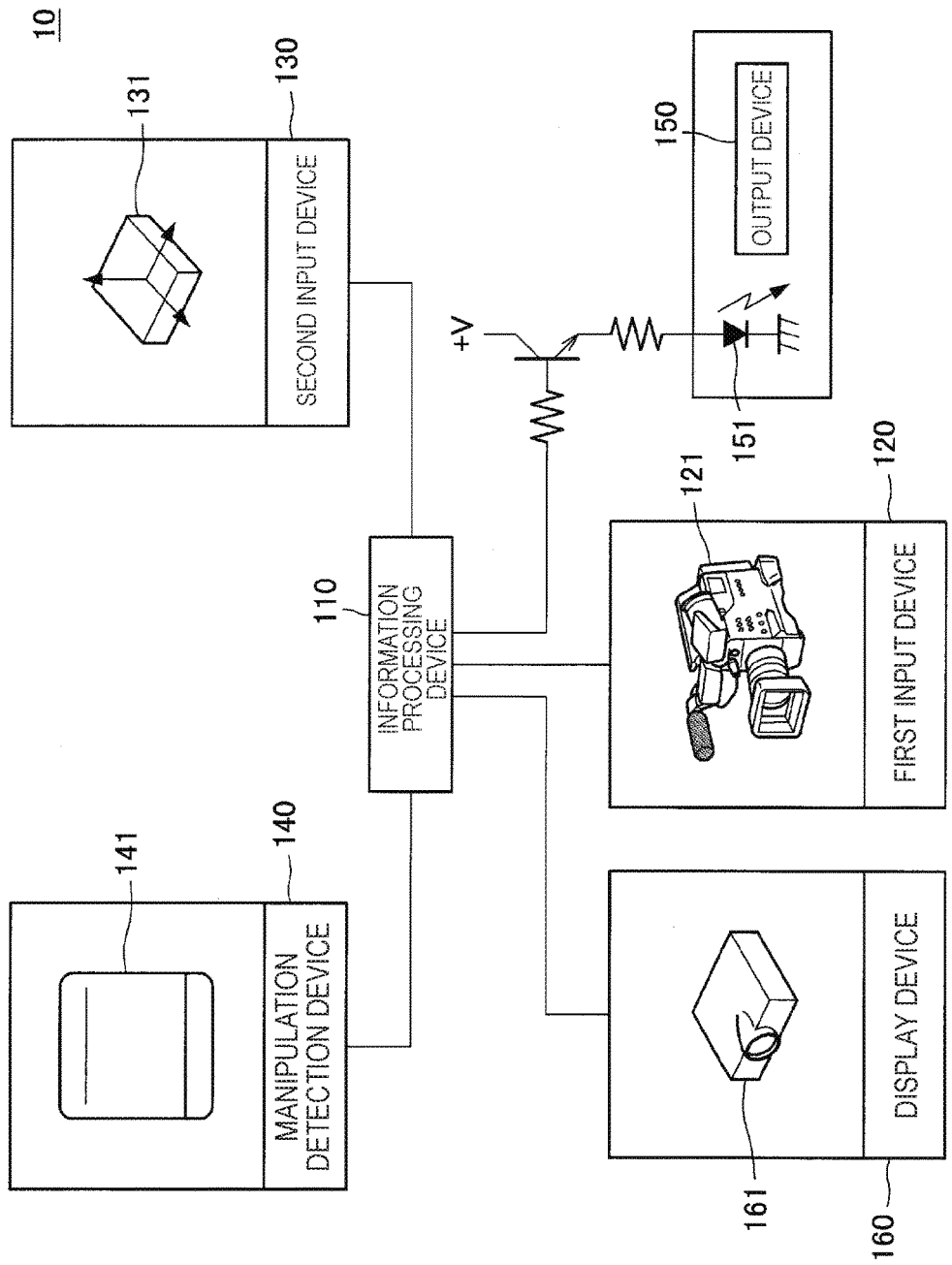
FIG. 1 is a diagram illustrating a configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

The description will be made in the following order.
1. Overview of information processing system
2. Functional configuration example of information processing system
3. Functional details of information processing system
4. Hardware configuration example of information processing system
5. Conclusion <1. Overview of Information Processing System>

First, a configuration example of an information processing system 10 according to an embodiment of the present disclosure will be described. FIG. 1 is a diagram for describing a configuration example of the information processing system 10 according to the embodiment of the present disclosure. As illustrated in FIG. 1, the information processing system 10 includes an information processing device 110, a first input device 120, a second input device 130, a manipulation detection device 140, an output device 150, and a display device 160.

The display device 160 has a function of displaying a screen. Further, the display device 160 has a function of displaying an image at a position output from the information processing device 110. In the present specification, a case in which the display device 160 is a projector 161 will be mainly described. However, the display device 160 may be a liquid crystal display (LCD), a plasma display panel (PDP), an organic electro-luminescence (EL) display, or a hologram display device as long as the display device 160 has a function of displaying an image on a screen.

The output device 150 has a function of transmitting a first signal to the first input device 120. In the present specification, a case in which the first signal is a position of light radiated to a screen will be mainly described. However, the first signal may not be a position of light radiated to a screen. Further, in the present specification, a case in which light radiated to a screen is infrared light will be mainly described (a case in which the output device 150 is an infrared (IR) light-emitting device 151 will be mainly described). However, light radiated to a screen is not limited to infrared light. For example, light radiated to a screen may include at least one of infrared light, visible light, and laser light. In the following description, a position of light radiated to a screen is referred to as an "infrared signal."

The manipulation detection device 140 has a function of detecting a manipulation from a user. For example, the manipulation detection device 140 has a function of detecting a tap manipulation and a long pressing manipulation from a user. In the present specification, a case in which the manipulation detection device 140 is a touch panel 141 will be mainly described. However, the manipulation detection device 140 may be a switch as long as the manipulation detection device 140 has a function of detecting a manipulation from a user. Furthermore, when the manipulation detection device 140 is the touch panel 141, a type of touch panel is not limited.

The first input device 120 has a function of receiving a first signal from the output device 150 and transmitting the first signal to the information processing device 110. In the present specification, a case in which the first input device 120 is an input device that detects the position of light radiated to a screen will be mainly described. In particular, in the present specification, a case in which the first input device 120 is an image sensor 121 that detects infrared light will be mainly described. However, when light radiated to a screen is visible light, the first input device 120 may be an input device that detects the position of the visible light. Further, when light radiated to a screen is laser light, the first input device 120 may be an input device that detects the position of the laser.

The second input device 130 has a function of transmitting a second signal different from the first signal to the information processing device 110. For example, when the second input device 130 has a predetermined sensor, the second input device 130 may transmit a motion detected by the predetermined sensor to the information processing device 110. In the present specification, a case in which the second input device 130 is a gyro sensor 131 and a motion is an angular velocity detected by the gyro sensor will be mainly described. However, the second input device 130 is not limited to the gyro sensor 131. For example, a motion may include at least one of an angular velocity detected by a gyro sensor, acceleration detected by an acceleration sensor, and a movement amount of a predetermined object (for example, the body of a user) recognized through gesture recognition.

The information processing device 110 has a function of receiving infrared light from the first input device 120 and a function of receiving an angular velocity from the second input device 130. Further, the information processing device 110 can also calculate the position of an image on the basis of infrared light and can also calculate the position of an image on the basis of an angular velocity. Further, the information processing device 110 can output the calculated position to the display device 160. Further, at a desired timing, the information processing device 110 can transmit a request for transmitting infrared light to the output device 150 (hereinafter also referred to as an "ID LED ON notification").

The configuration example of the information processing system 10 according to the embodiment of the present disclosure has been described above.

<2. Functional Configuration Example of Information Processing System>

Figure 2:
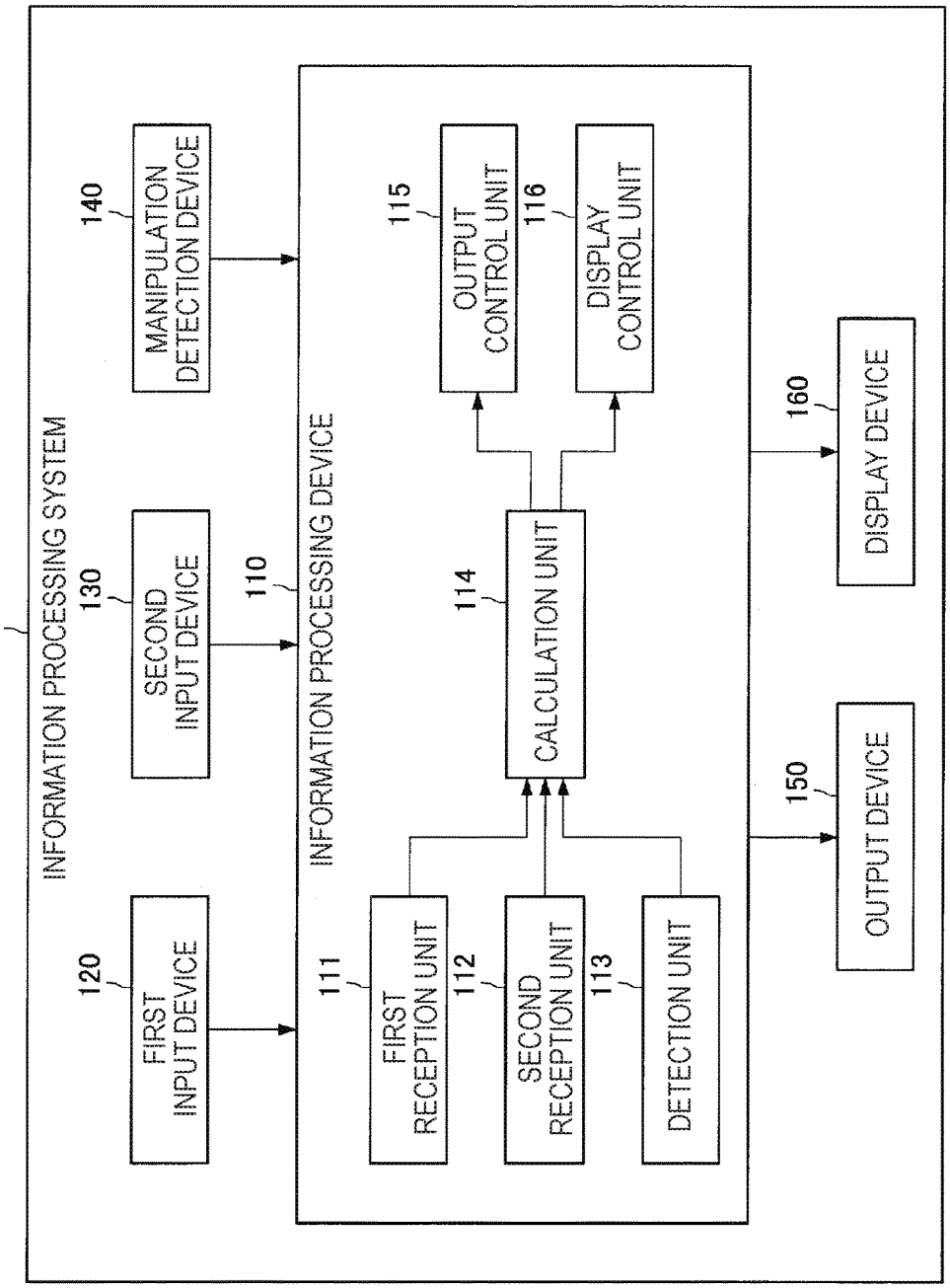
FIG. 2 is a diagram illustrating a functional configuration example of the information processing system according to the embodiment.

Next, a functional configuration example of the information processing system 10 according to the embodiment of the present disclosure will be described. FIG. 2 is a diagram illustrating the functional configuration example of the information processing system 10 according to the embodiment of the present disclosure. As illustrated in FIG. 2, the information processing system 10 includes the information processing device 110, the first input device 120, the second input device 130, the manipulation detection device 140, the output device 150, and the display device 160.

When the information processing device 110 executes a program stored in a storage medium, various functions of the information processing device 110 are fulfilled. As illustrated in FIG. 2, the information processing device 110 includes functional blocks such as a first reception unit 111, a second reception unit 112, a detection unit 113, a calculation unit 114, an output control unit 115, and a display control unit 116. The details of the functions of these functional blocks will be described below.

The detection unit 113, the calculation unit 114, the output control unit 115, the display control unit 116, and the like may be configured by a processor such as a central processing unit (CPU), a graphics processing unit (GPU), a digital signal processor (DSP), or a system on chip (SoC). Further, these units may be configured by an electronic circuit that performs various arithmetic processes.

The functional configuration example of the information processing system 10 according to the embodiment of the present disclosure has been described above.

<3. Functional Details of Information Processing System>

Figure 3:
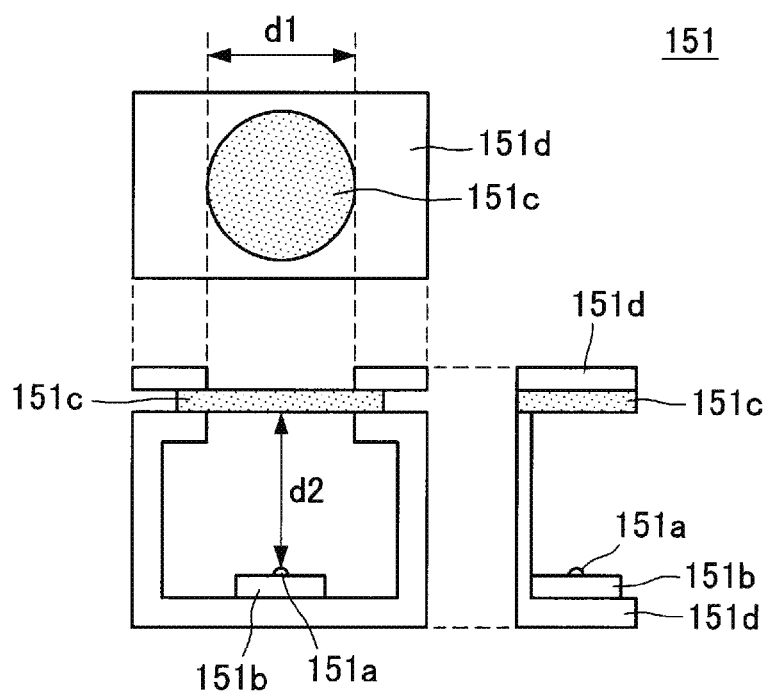
FIG. 3 is a diagram illustrating a configuration example of an output device according to the embodiment.

Next, the functional details of the information processing system 10 according to the embodiment of the present disclosure will be described. First, a configuration example of the IR light-emitting device 151 will be described. FIG. 3 is a diagram illustrating the configuration example of the IR light-emitting device 151. As illustrated in FIG. 3, the IR light-emitting device 151 may include an IR LED 151a, a fixing base 151b, a Fresnel lens 151c, and a grip unit 151d. The IR LED 151a is fixed to the fixing base 151b. The Fresnel lens 151c creates a nearly parallel light beam by condensing the infrared light emitted from the LED 151a and sends the light beam to the outside. The grip unit 151d grips the Fresnel lens 151c.

Here, a diameter d1 of the Fresnel lens 151c and a distance d2 between the LED 151a and the Fresnel lens 151c are not particularly limited. The diameter d1 may be 10 mm and the distance d2 may be 15 mm. The configuration example of the IR light-emitting device 151 has been described above, but the configuration of the IR light-emitting device 151 is not limited to this example.

Figure 4:
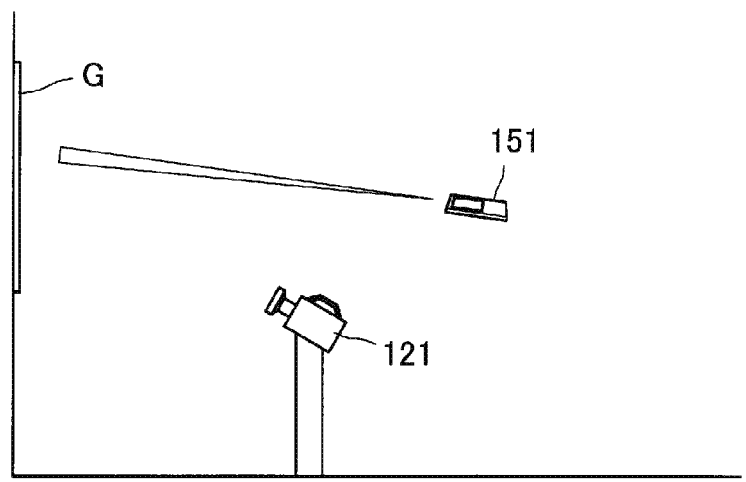
FIG. 4 is a diagram illustrating an example of transmission and reception of an infrared signal.

Next, an example of communication of an infrared signal will be described. FIG. 4 is a diagram illustrating an example of transmission and reception of an infrared signal. Referring to FIG. 4, infrared light is radiated to a screen G by the IR light-emitting device 151. The screen G is imaged by the image sensor 121 and an imaging result from the image sensor 121 is transmitted to the information processing device 110. In the information processing device 110, the first reception unit 111 receives the imaging result from the image sensor 121 and the calculation unit 114 decides the position of an image on the screen G on the basis of the imaging result.

More specifically, the calculation unit 114 may decide the position of the infrared light radiated to the screen G as the position of the image (absolute coordinates may be designated by an infrared signal). The display control unit 116 displays the image at the decided position. FIG. 4 illustrates the example in which the image sensor 121 is used as an example of the first input device 120, but a position sensing device (PSD) may be used instead of the image sensor 121. Alternatively, an array of photodiodes may be used instead of the image sensor 121. The example of the communication of the infrared signal has been described above.

Next, an example of communication of an angular velocity will be described. When an angular velocity is detected by the gyro sensor 131, the angular velocity is transmitted from the gyro sensor 131 to the information processing device 110. In the information processing device 110, the second reception unit 112 receives the angular velocity and the calculation unit 114 calculates the position of an image on the screen G on the basis of the angular velocity. Specifically, the calculation unit 114 may decide the position of a new image by adding a vector on the screen G according to the angular velocity to the position of a previous image (relative coordinates may be designated in accordance with the angular velocity).

For example, a technique for calculating a vector on the screen G according to the angular velocity is disclosed in WO 2009/008372. However, the technique for calculating a vector on the screen G according to the angular velocity is not particularly limited. The display control unit 116 displays the image at the position calculated by the calculation unit 114.

As described above, the calculation unit 114 has a first mode (hereinafter also referred to as an "absolute coordinate designation mode") in which the position of infrared light radiated to the screen G is decided as the position of an image. Further, the calculation unit 114 has a second mode (hereinafter also referred to as a "relative coordinate designation mode") in which the position of a new image is decided by adding a vector on the screen G according to an angular velocity to the position of a previous image.

Then, when a user manipulation event is detected in the absolute coordinate designation mode, the calculation unit 114 switches a mode from the absolute coordinate designation mode to the relative coordinate designation mode. In this configuration, it is possible to calculate the position of an image displayed on the screen G more flexibly. For example, by switching the mode from the absolute coordinate designation mode to the relative coordinate designation mode, it is possible to obtain the following advantageous effects.

For example, in the absolute coordinate designation mode, since the position of infrared light radiated to the screen G is decided as the position of an image, it is necessary to change the direction of the output device 150 so that the infrared light is radiated to the screen G. Thus, there is a possibility of manipulability not being improved. In the relative coordinate designation mode, however, since the position of a new image is decided by adding a vector on the screen G according to an angular velocity to the position of a previous image, restriction on the direction of the output device 150 is reduced. Accordingly, by switching the mode from the absolute coordinate designation mode to the relative coordinate designation mode, it is possible to improve manipulability.

Further, power consumption of the first input device 120 and the output device 150 used in the absolute coordinate designation mode is greater than power consumption of the second input device 130 used in the relative coordinate designation mode. For example, when the output device 150 radiates light, power consumption of the output device 150 easily increases. More specifically, when the output device 150 is the IR light-emitting device 151, power consumption of the IR LED 151a is about several tens of mA. In contrast, when the second input device 130 is the gyro sensor 131, power consumption of the gyro sensor 131 can be several mA. In this case, the former can consume several tens of times the power of the latter.

Here, it is assumed that a scheme of blinking the IR LED 151a through an intermittent operation is adopted. However, it is difficult to reduce power consumption of the IR LED 151a to about the same power consumption as the gyro sensor 131. Accordingly, by switching the mode from the absolute coordinate designation mode to the relative coordinate designation mode, it is possible to reduce the power consumption.

Further, in the absolute coordinate designation mode, there is a possibility of a disturbance (light radiated from a fluorescent lamp, solar light, or the like) interfering with light radiated from the output device 150 and the light not being detected. For example, when light radiated from the output device 150 is infrared light, a component with a wavelength identical to the wavelength of infrared light is contained in a disturbance in some cases. Therefore, the disturbance may become noise of the infrared light. Furthermore, when infrared light and a disturbance component may not be separated, there is a possibility of a position to which the infrared light is radiated not being correctly detected. Accordingly, by switching the mode from the absolute coordinate designation mode to the relative coordinate designation mode, it is possible to improve detection precision of light radiated from the output device 150.

Conversely, when a user manipulation event is detected in the relative coordinate designation mode, the calculation unit 114 may switch the mode from the relative coordinate designation mode to the absolute coordinate designation mode. In this configuration, it is possible to calculate the position of an image displayed on the screen G more flexibly. For example, by switching the mode from the relative coordinate designation mode to the absolute coordinate designation mode, it is possible to obtain the following advantageous effects.

For example, in the relative coordinate designation mode, the position of a new image is decided by adding a vector on the screen G according to an angular velocity to the position of a previous image. Therefore, it is difficult to give a sense of designating the position of the image directly to a user. Therefore, a user interface in which a position on the screen G is intuitively designated is not suitable. Accordingly, by switching the mode from the relative coordinate designation mode to the absolute coordinate designation mode, it is possible to give a sense of designating the position of an image directly to the user.

For example, in the relative coordinate designation mode, the position of a new image is decided by adding a vector on the screen G according to an angular velocity to the position of a previous image. Therefore, for example, when the user does not ascertain the position of the previous image, it is easy for the user to miss the position of the image. Furthermore, with an increase in a resolution and an angle of view of the screen G, an image size occupying the entire screen G decreases, which results in a situation in which the user misses the image more easily. Accordingly, by switching the mode from the relative coordinate designation mode to the absolute coordinate designation mode, it is possible to reduce the possibility of the user missing the position of an image.

In addition, since infrared light is considered to affect living bodies less than laser light or the like, it is more suitable to use infrared light. Furthermore, visible light radiated to the screen G is easily noticed by the eyes of the user, but infrared light radiated to the screen G is not easily noticed by the eyes of the user. Accordingly, since it is more difficult for the user to ascertain a deviation between the position of an image displayed on the screen G and the position of the radiated infrared light than a deviation between the position of the image displayed on the screen G and the position of the radiated visible light, it is more suitable to use the infrared light.

Figure 5:
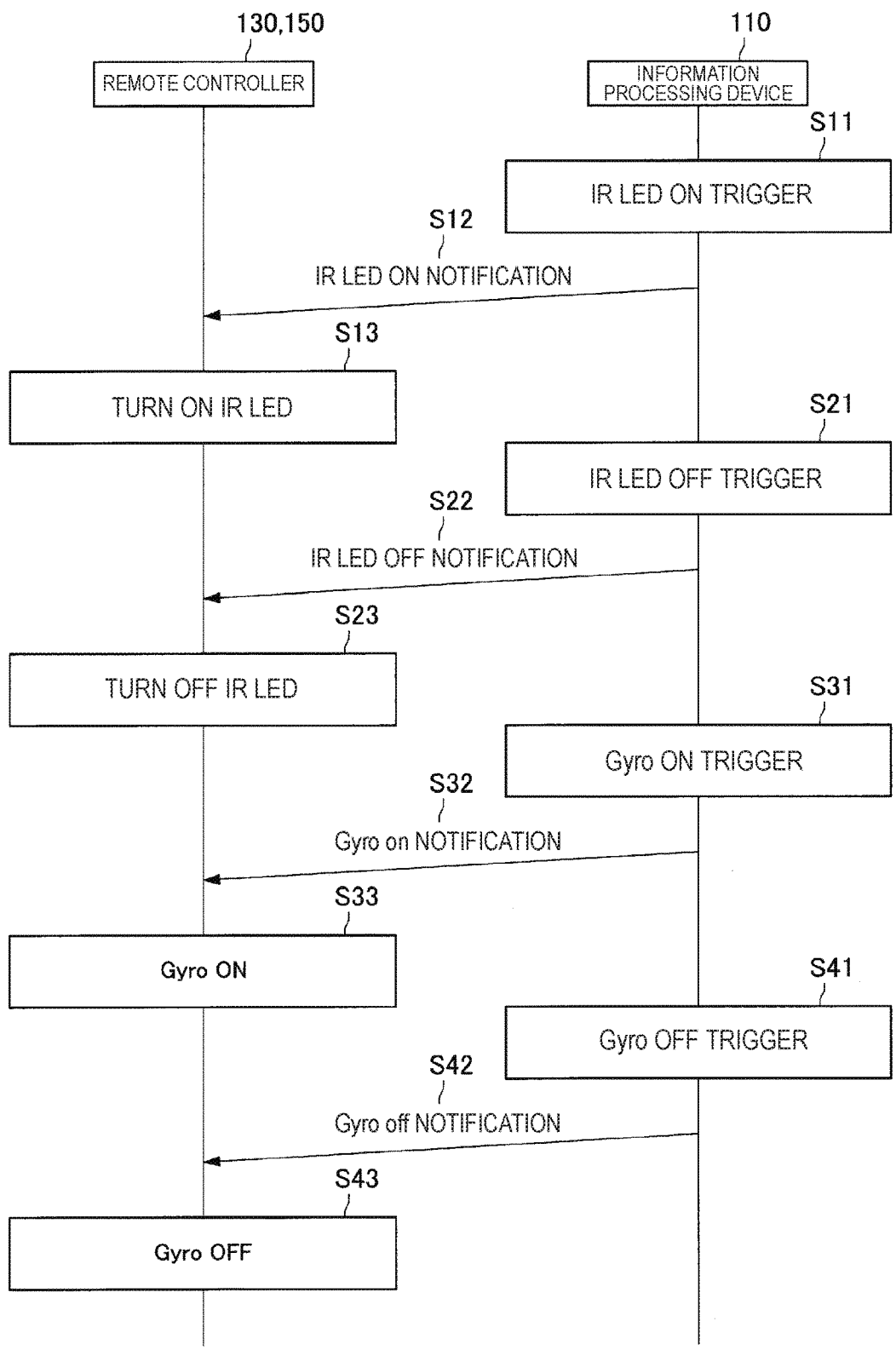
FIG. 5 is a diagram illustrating an example of a technique for switching a mode between a relative coordinate designation mode and an absolute coordinate designation mode.

Next, an example of a technique for switching the mode between the relative coordinate designation mode and the absolute coordinate designation mode will be described. FIG. 5 is a diagram illustrating an example of the technique for switching the mode between a relative coordinate designation mode and an absolute coordinate designation mode. In addition, since the example of the technique for switching the mode between the relative coordinate designation mode and the absolute coordinate designation mode illustrated in FIG. 5 is merely an example, the technique for switching the mode between the relative coordinate designation mode and the absolute coordinate designation mode is not limited to the example illustrated in FIG. 5. Further, in the example illustrated in FIG. 5, the second input device 130 and the output device 150 are embedded in the same remote controller.

As illustrated in FIG. 5, when an IR LED ON trigger (a transmission start trigger of an infrared signal) is detected (S11), the output control unit 115 outputs an IR LED ON notification (a transmission start request of the infrared signal) to the output device 150 (S12). When the output device 150 receives the IR LED ON notification, lighting of the IR LED 151a starts. When the lighting of the IR LED 151a starts and infrared light thus starts to be radiated, a position to which the infrared light is radiated on the screen is input as an infrared signal to the first input device 120 and an image is displayed at the position according to the infrared signal by the information processing device 110.

Conversely, when an IR LED OFF trigger (a transmission end trigger of an infrared signal) is detected (S21), the output device 150 outputs an IR LED OFF notification (a transmission end request of the infrared signal) to the output device 150 (S22). When the output device 150 receives the IR LED OFF notification, the lighting of the IR LED 151a ends. When the lighting of the IR LED 151a ends and the radiation of the infrared light ends, the input of the infrared signal to the first input device 120 stops.

Conversely, when a gyro ON trigger (a transmission start trigger of an angular velocity) is detected (S31), the output control unit 115 outputs a gyro ON notification (a transmission start request of the angular velocity) to the second input device 130 (S32). When the second input device 130 receives the gyro ON notification, power of the gyro sensor 131 is turned on. When the power of the gyro sensor 131 is turned on, the angular velocity detected by the gyro sensor 131 is transmitted to the information processing device 110 and an image is displayed at a position according to the angular velocity by the information processing device 110.

Conversely, when a gyro OFF trigger (a transmission end trigger of the angular velocity) is detected (S41), the output control unit 115 outputs a gyro OFF notification (the transmission end trigger of the angular velocity) to the output device 150 (S42). When the output device 150 receives the gyro OFF notification, the power of the gyro sensor 131 is turned off. When the power of the gyro sensor 131 is turned off, the detection of the angular velocity by the gyro sensor 131 stops.

Figure 6:
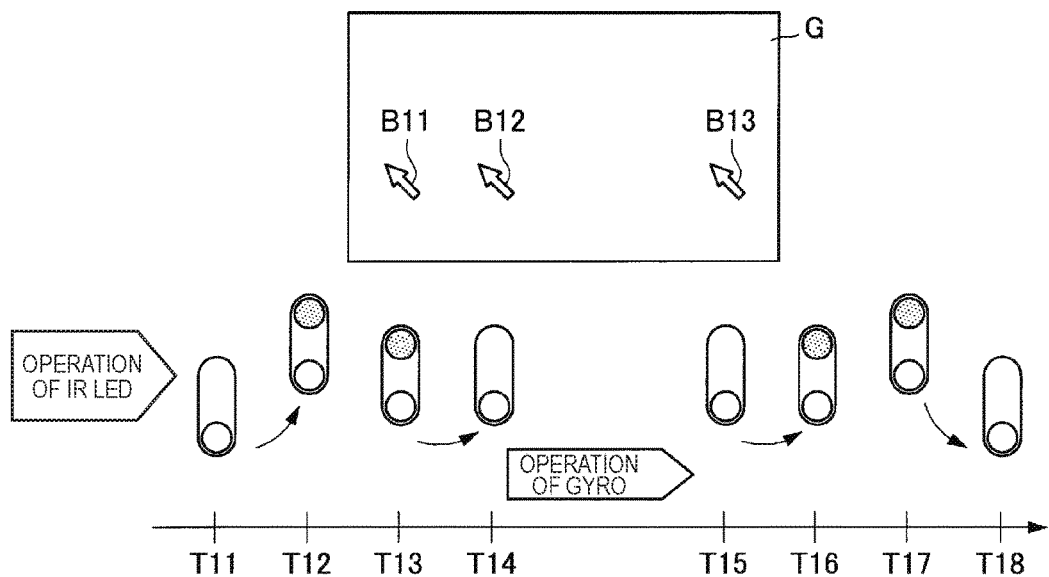
FIG. 6 is a diagram for describing a first example of a trigger generation pattern.

The example of the technique for switching the mode between the relative coordinate designation mode and the absolute coordinate designation mode has been described above. Next, generation examples of various triggers will be described. FIG. 6 is a diagram for describing a first example of a trigger generation pattern. Referring to FIG. 6, it is indicated that it is ascertained whether the IR LED 151a is turned on or off at each of times T11 to T17. Further, the gyro sensor 131 and the IR LED 151a are embedded in the same remote controller in the example illustrated in FIG. 6 as well.

First, when it is assumed that the user transitions the remote controller from a stationary state to a moving state (times T11 and T12), an angular velocity detected by the gyro sensor 131 is changed. Then, the output control unit 115 detects that the angular velocity is changed as an IR LED ON trigger. When the IR LED ON trigger is detected, the output control unit 115 outputs an IR LED ON notification to the output device 150. When the output device 150 receives the IR LED ON notification, lighting of the IR LED 151a starts.

Thereafter, when the lighting the IR LED 151a starts and the infrared light thus starts to be radiated so that the infrared light is radiated to the screen G (time T13), a position to which the infrared light is radiated on the screen G is input as an infrared signal to the first input device 120. Then, when the information processing device 110 receives the infrared signal from the first input device 120, the information processing device 110 displays an image B11 at the position according to the infrared signal (the display control unit 116 displays the image B11 at the position to which the infrared light is radiated). Further, when the first reception unit 111 receives the infrared signal, the output control unit 115 detects that the infrared signal is received as an IR LED OFF trigger.

Subsequently, when the IR LED OFF trigger is detected, the output control unit 115 outputs an IR LED OFF notification to the output device 150. When the output device 150 receives the IR LED OFF notification, the lighting of the IR LED 151a ends (time T14). When the lighting of the IR LED 151a ends and the radiation of the infrared light thus ends, the input of the infrared signal to the first input device 120 stops. Further, referring to FIG. 6, the display control unit 116 displays an image B12 at a position at which the infrared light is turned off.

After the infrared light is turned off, the calculation unit 114 calculates a position of a new image by adding a vector on the screen G according to the angular velocity detected by the gyro sensor 131 to the position of the previous image and the display control unit 116 displays an image at the position of the new image (times T14 and T15). Subsequently, it is assumed that the position of an image B13 deviates from the inside of the screen G. Then, the output control unit 115 detects that the position of the image B13 deviates from the inside to the outside of the screen G as an IR LED ON trigger (times T15 and T16).

When the IR LED ON trigger is detected, the output control unit 115 outputs an IR LED ON notification to the output device 150. When the output device 150 receives the IR LED ON notification, lighting of the IR LED 151a starts and the image B13 is not displayed. Subsequently, it is assumed that the angular velocity is not changed for a predetermined time (time T17). Then, the output control unit 115 detects that the angular velocity is not changed for the predetermined time as an IR LED OFF trigger. Subsequently, when the IR LED OFF trigger is detected, the output control unit 115 outputs an IR LED OFF notification to the output device 150. When the output device 150 receives the IR LED OFF notification, the lighting of the IR LED 151a ends (time T18). A subsequent state may return to the same state as the state at time T11.

Figure 7:
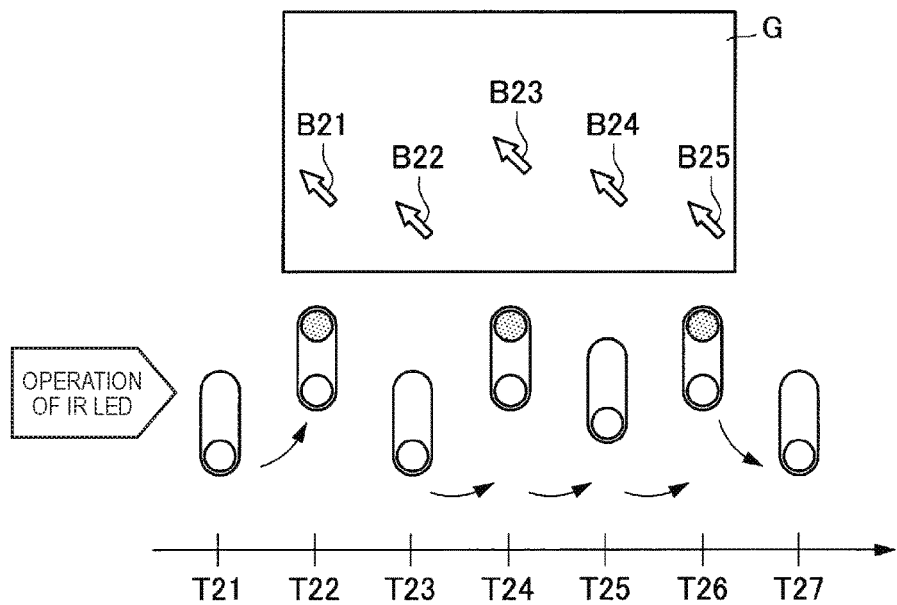
FIG. 7 is a diagram for describing a second example of a trigger generation pattern.

FIG. 7 is a diagram for describing a second example of a trigger generation pattern. Referring to FIG. 7, it is indicated that it is ascertained whether the IR LED 151a is turned on or off at each of times T21 to T27. Further, the gyro sensor 131 and the IR LED 151a are embedded in the same remote controller in the example illustrated in FIG. 7 as well.

First, when an angular velocity detected by the gyro sensor 131 is changed, the output control unit 115 detects that the angular velocity detected by the gyro sensor 131 is changed as a trigger for periodically repeating transmission start and transmission end of the infrared signal (time T21). That is, when it is detected that the angular velocity detected by the gyro sensor 131 is changed, the output control unit 115 outputs an IR LED ON trigger and the IR LED OFF trigger periodically and alternately to the output device 150.

When the output device 150 receives the IR LED ON notification, lighting of the IR LED 151a starts (times T22, T24, and T26). When the output device 150 receives the IR LED OFF notification, the lighting of the IR LED 151a ends (times T23, T25, and T27). When the lighting of the IR LED 151a starts and the infrared light thus starts to be radiated (time T13), the information processing device 110 displays images B21, B23, and B25 at positions according to infrared signals (the display control unit 116 displays the images B21, B23, and B25 at positions to which the infrared light is radiated). When the infrared light is periodically used, the position of the image can be periodically adjusted.

Conversely, when the angular velocity detected by the gyro sensor 131 is not changed, the output control unit 115 detects that the angular velocity detected by the gyro sensor 131 is not changed as the IR LED OFF trigger. When the lighting of the IR LED 151a ends and the infrared light is thus not radiated, the calculation unit 114 calculates positions B22 and B24 of new images by adding vectors on the screen G according to the angular velocities detected by the gyro sensor 131 to the positions of the previous images and the display control unit 116 displays images at the positions B22 and B24 of the new images.

Figure 8:
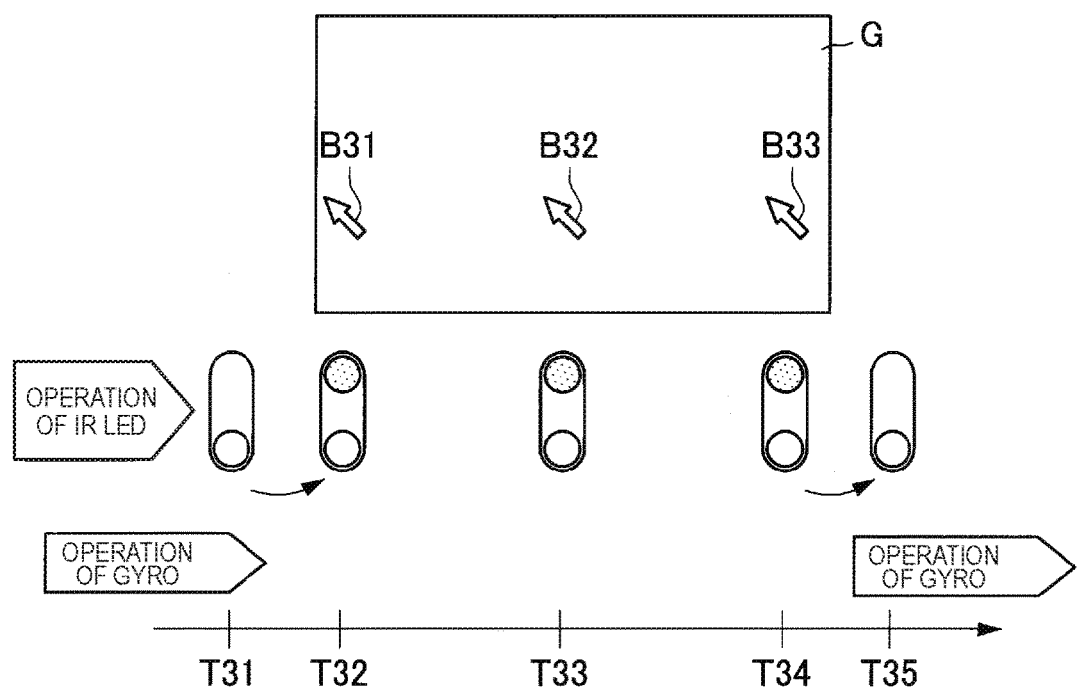
FIG. 8 is a diagram for describing a third example of a trigger generation pattern.

FIG. 8 is a diagram for describing a third example of a trigger generation pattern. Referring to FIG. 8, it is indicated that it is ascertained whether the IR LED 151a is turned on or off at each of times T31 to T35. Further, the gyro sensor 131 and the IR LED 151a are embedded in the same remote controller in the example illustrated in FIG. 8 as well.

First, when it is assumed that the user transitions the remote controller from a stationary state to a moving state (times T31 and T32), an angular velocity detected by the gyro sensor 131 is changed. Then, the output control unit 115 detects that the angular velocity is changed as an IR LED ON trigger. When the IR LED ON trigger is detected, the output control unit 115 outputs an IR LED ON notification to the output device 150. When the output device 150 receives the IR LED ON notification, lighting of the IR LED 151a starts. Further, the output control unit 115 detects that the angular velocity is changed as a gyro OFF trigger. When the gyro OFF trigger is detected, the output control unit 115 outputs a gyro OFF notification to the second input device 130. When the second input device 130 receives the gyro OFF notification, the power of the gyro sensor 131 is turned on.

Thereafter, when the lighting of the IR LED 151a starts and the infrared light thus starts to be radiated so that the infrared light is radiated to the screen G (time T32), a position to which the infrared light is radiated on the screen G is input as an infrared signal to the first input device 120. Then, when the information processing device 110 receives the infrared signal from the first input device 120, the information processing device 110 displays images B31 to B33 at the positions according to the infrared signal (the display control unit 116 displays the images B31 to B33 at the positions to which the infrared light is radiated).

Subsequently, it is assumed that the position of the image B33 deviates from the inside of the screen G and the first reception unit 111 does not receive the infrared signal. Then, the output control unit 115 detects that the first reception unit 111 does not receive the infrared signal as a gyro ON trigger (time T35). For example, the output control unit 115 may confirm whether the infrared signal is received for each predetermined period.

When the gyro ON trigger is detected, the output control unit 115 outputs a gyro ON notification to the second input device 130. When the second input device 130 receives the gyro ON notification, the power of the gyro sensor 131 is turned on and the image B13 is not displayed. Subsequently, the state may return to the same state as the state at time T31.

Figure 9:
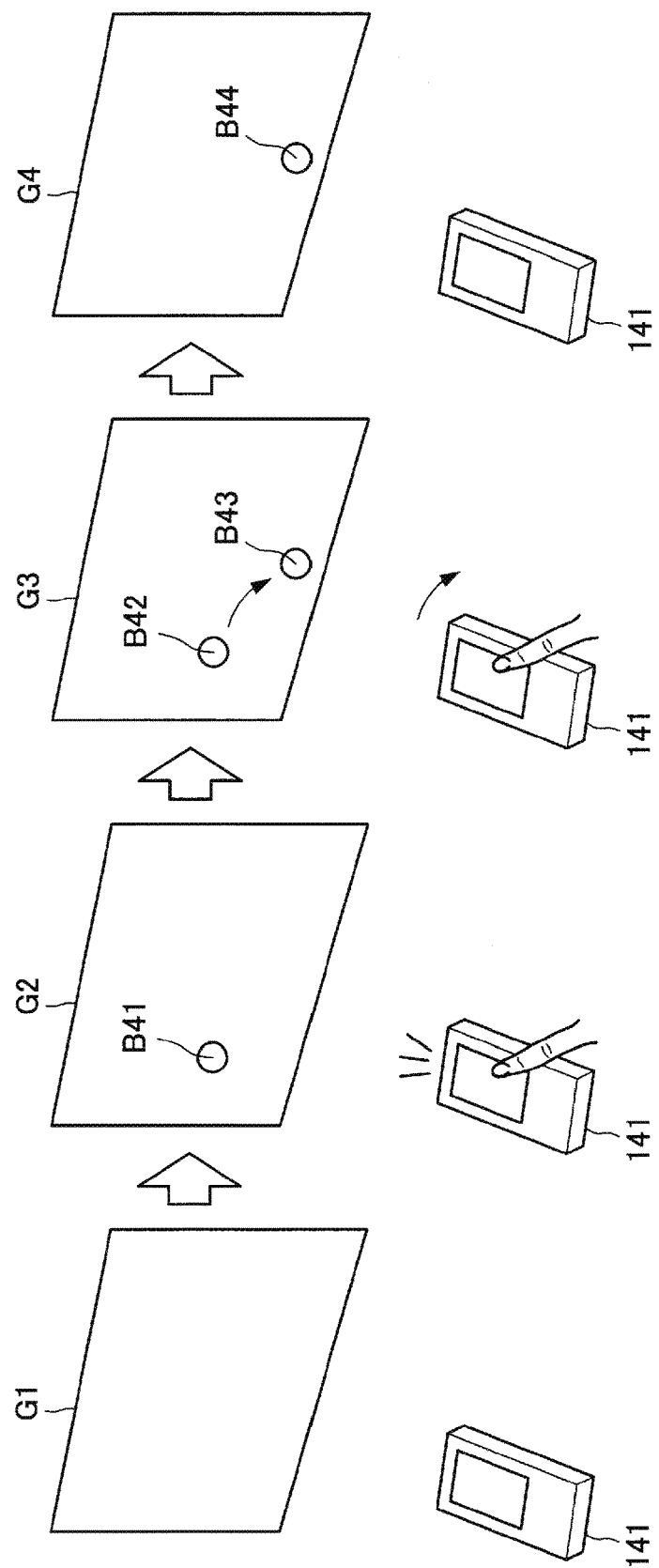
FIG. 9 is a diagram for describing a fourth example of a trigger generation pattern.

FIG. 9 is a diagram for describing a fourth example of a trigger generation pattern. Referring to FIG. 9, screens G1 to G4 transitioned over time are displayed. When no tap manipulation is performed on the touch panel 141, the IR LED 151a is turned off and the power of the gyro sensor 131 is not turned on either (screen G1). Then, when the user performs a tap manipulation on the touch panel 141, the output control unit 115 detects that the tap manipulation is performed on the touch panel 141 as an IR LED ON trigger.

When the IR LED ON trigger is detected, the output control unit 115 outputs an IR LED ON notification to the output device 150. When the output device 150 receives the IR LED ON notification, lighting of the IR LED 151a starts. When the lighting of the IR LED 151a starts, the infrared light starts to be radiated, and a position to which the infrared light is radiated on the screen is input as an infrared signal to the first input device 120, the information processing device 110 displays an image B41 at a position according to the infrared signal (screen G2).

In addition, when the infrared signal is not radiated to the screen G2 and the infrared signal is not input to the first input device 120 (for example, when the radiation of the infrared light is not oriented toward the screen G2 or the infrared light does not reach the screen G2), the image B41 may be displayed at the position of a previous image. Thereafter, the output control unit 115 detects that a predetermined time elapses as an IR LED OFF trigger and outputs an IR LED OFF notification to the output device 150. When the output device 150 receives the IR LED OFF notification, the lighting of the IR LED 151a ends.

When a tap manipulation on the touch panel 141 continues and the user performs a long pressing manipulation on the touch panel 141, the output control unit 115 detects that the long pressing manipulation on the touch panel 141 is performed as the gyro ON trigger. When the gyro ON trigger is detected, the output control unit 115 outputs a gyro ON notification to the second input device 130. When the second input device 130 receives the gyro ON notification, the power of the gyro sensor 131 is turned on. When the power of the gyro sensor 131 is turned on, an angular velocity detected by the gyro sensor 131 is transmitted to the information processing device 110 and the information processing device 110 displays images B42 and B43 at positions according to the angular velocity (screen G3).

When the long pressing manipulation on the touch panel 141 ends, the output control unit 115 detects that the long pressing manipulation on the touch panel 141 ends as the gyro OFF trigger. When the gyro OFF trigger is detected, the output control unit 115 outputs a gyro OFF notification to the output device 150. When the output device 150 receives the gyro OFF notification, the power of the gyro sensor 131 is turned off. When power of the gyro sensor 131 is turned off, the detection of the angular velocity by the gyro sensor 131 stops and the position of the image B44 stops (screen G4).

Figure 10:
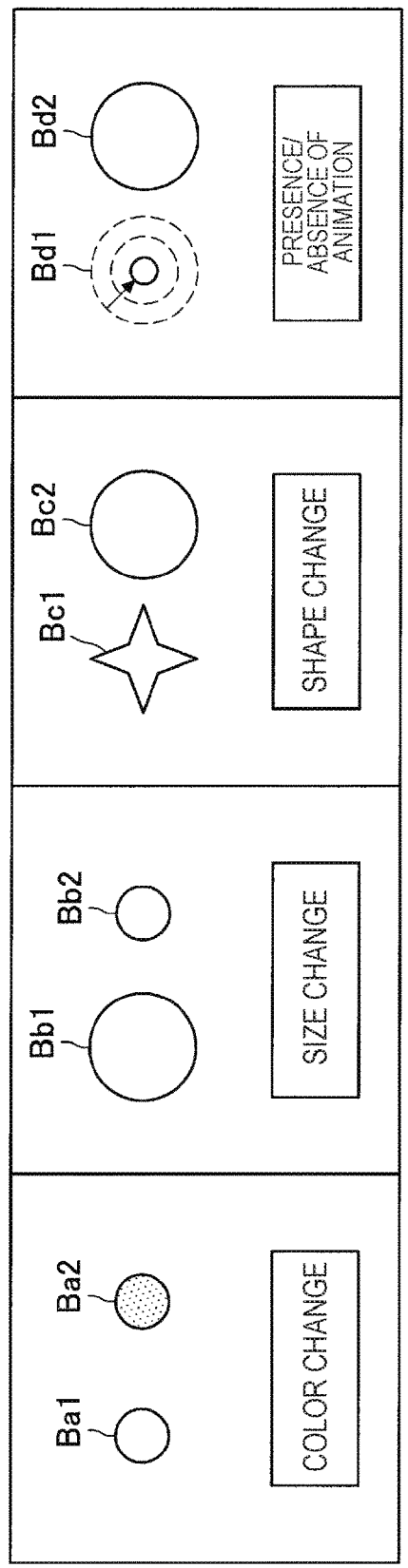
FIG. 10 is a diagram illustrating an example of an image displayed in each of the absolute coordinate designation mode and the relative coordinate designation mode.

The first to fourth examples of the trigger generation patterns have been described. Here, the user may be able to easily ascertain whether the mode is the absolute coordinate designation mode or the relative coordinate designation mode in an operation. For this reason, the display control unit 116 may display an image different between the absolute coordinate designation mode and the relative coordinate designation mode. FIG. 10 is a diagram illustrating an example of an image displayed in each of the absolute coordinate designation mode and the relative coordinate designation mode.

For example, as illustrated in FIG. 10, the display control unit 116 may change at least one of a color, a size, a shape, and the presence or absence of animation of an image displayed between the absolute coordinate designation mode and the relative coordinate designation mode. More specifically, a color differs between images Ba1 and Ba2. A size differs between image Bb1 and Bb2. A shape differs between images Bc1 and Bc2. The presence or absence of animation differs between images Bd1 and Bd2.

In addition, a correspondence relation between the mode and the color (or the size, the shape, the presence or absence of animation) is not particularly limited. The display control unit 116 may gradually change at least one of the color, the size, the shape, and the presence or absence of animation of the image displayed between the absolute coordinate designation mode and the relative coordinate designation mode. Further, a vibration pattern that differs between the absolute coordinate designation mode and the relative coordinate designation mode may be able to be given to the remote controller.

Figure 11:
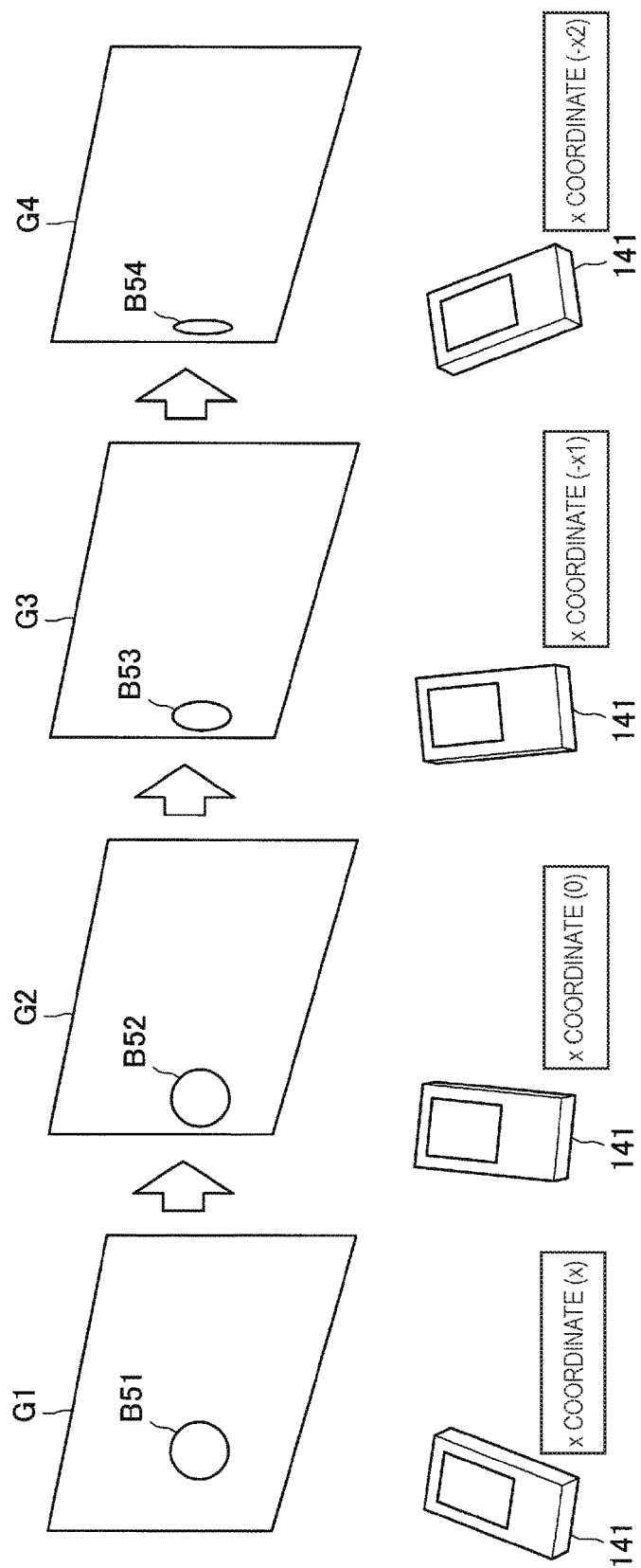
FIG. 11 is a diagram illustrating a display example of an image when the position of an image deviates from the inside of a screen.

In the above-described example, the case in which the positions of the images are inside a screen has been mainly described. However, even when the position of an image deviates from the inside of a screen, the calculation unit 114 can calculate the position of a virtual image on an extended plane of a screen on the basis of an angular velocity detected by the gyro sensor 131 and the display control unit 116 can display the image. FIG. 11 is a diagram illustrating a display example of an image when the position of an image deviates from the inside of a screen. Referring to FIG. 11, screens G1 to G4 transitioned over time are displayed.

First, as illustrated in FIG. 11, the calculation unit 114 calculates the position of an image inside the screen on the basis of an angular velocity detected by the gyro sensor 131 (from an x coordinate (x) to an x coordinate (0) on the screens G1 and G2). At this time, the display control unit 116 may display images B51 and B52 from the x coordinate (x) to the x coordinate (0). On the screen G2, the position of the image B52 is assumed to reach an end of the screen G2.

Subsequently, when the position of an image deviates from the inside of a screen, the calculation unit 114 can calculate the position of a virtual image on an extended plane of the screen on the basis of an angular velocity detected by the gyro sensor 131 (from an x coordinate (−x1) to an x coordinate (−x2) on the screens G3 and G4). At this time, the display control unit 116 may display images B53 and B54 that are deformed in accordance with a distance between the position of the virtual image on the extended plane of the screen and an end of the screen (from x1 to x2).

Figure 12:
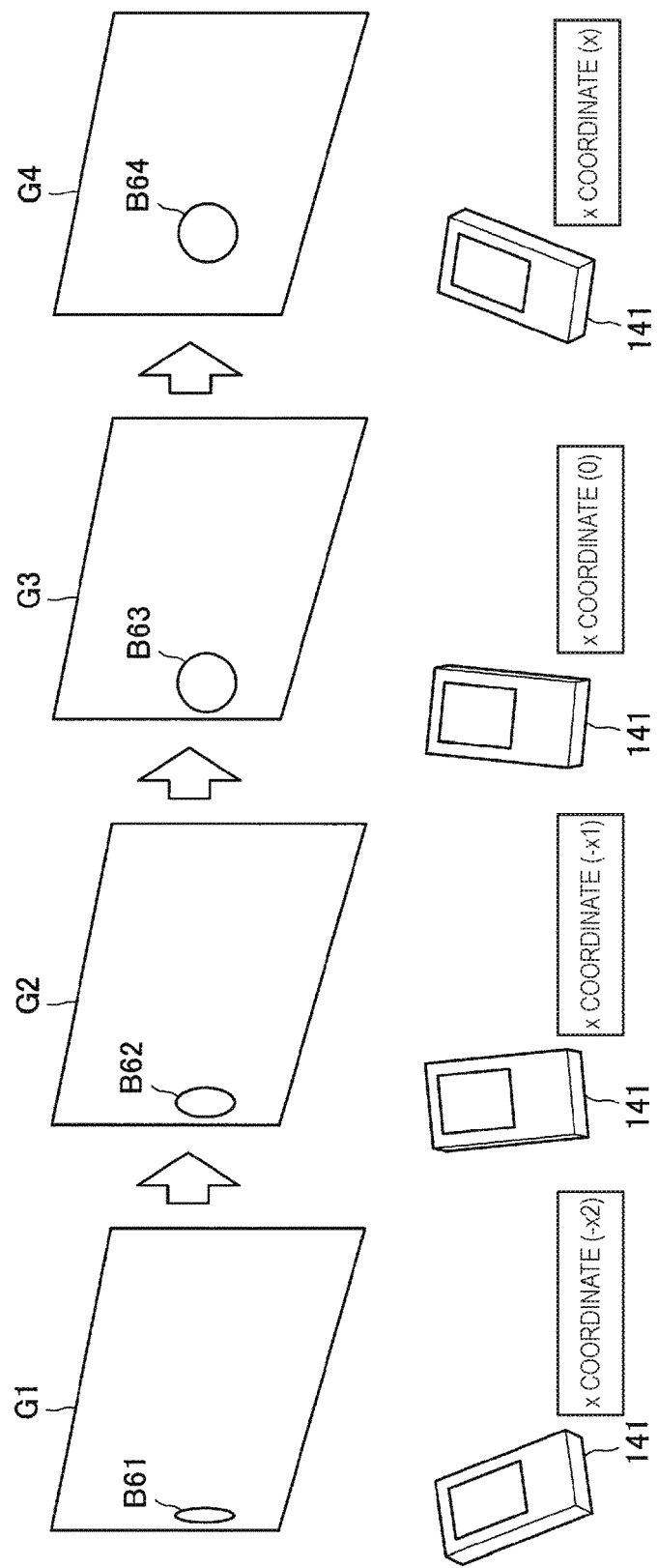
FIG. 12 is a diagram illustrating a display example of an image when the position of an image enters the inside of a screen.

The display example of the image when the position of the image deviates from the inside of the screen has been described. Next, a display example of an image when the position of the image enters the inside of a screen will be described. FIG. 12 is a diagram illustrating a display example of an image when the position of the image enters the inside of a screen. Referring to FIG. 12, screens G1 to G4 transitioned over time are displayed.

First, when the position of the image enters the inside of the screen, the calculation unit 114 can calculate the position of a virtual image on an extended plane of the screen on the basis of an angular velocity detected by the gyro sensor 131 (from an x coordinate (−x2) to an x coordinate (−x1) on the screens G1 and G2). At this time, the display control unit 116 may display images B61 and B62 deformed in accordance with a distance between the position of the virtual image on the extended plane of the screen and an end of the screen (from x2 to x1). On the screen G2, the position of the image B62 is assumed to reach an end of the screen G2.

Subsequently, as illustrated in FIG. 12, the calculation unit 114 calculates the position of an image inside the screen on the basis of an angular velocity detected by the gyro sensor 131 (from an x coordinate (0) to an x coordinate (x) on the screens G3 and G4). At this time, the display control unit 116 may display images B63 and B64 from the x coordinate (0) to the x coordinate (x).

Figure 13:
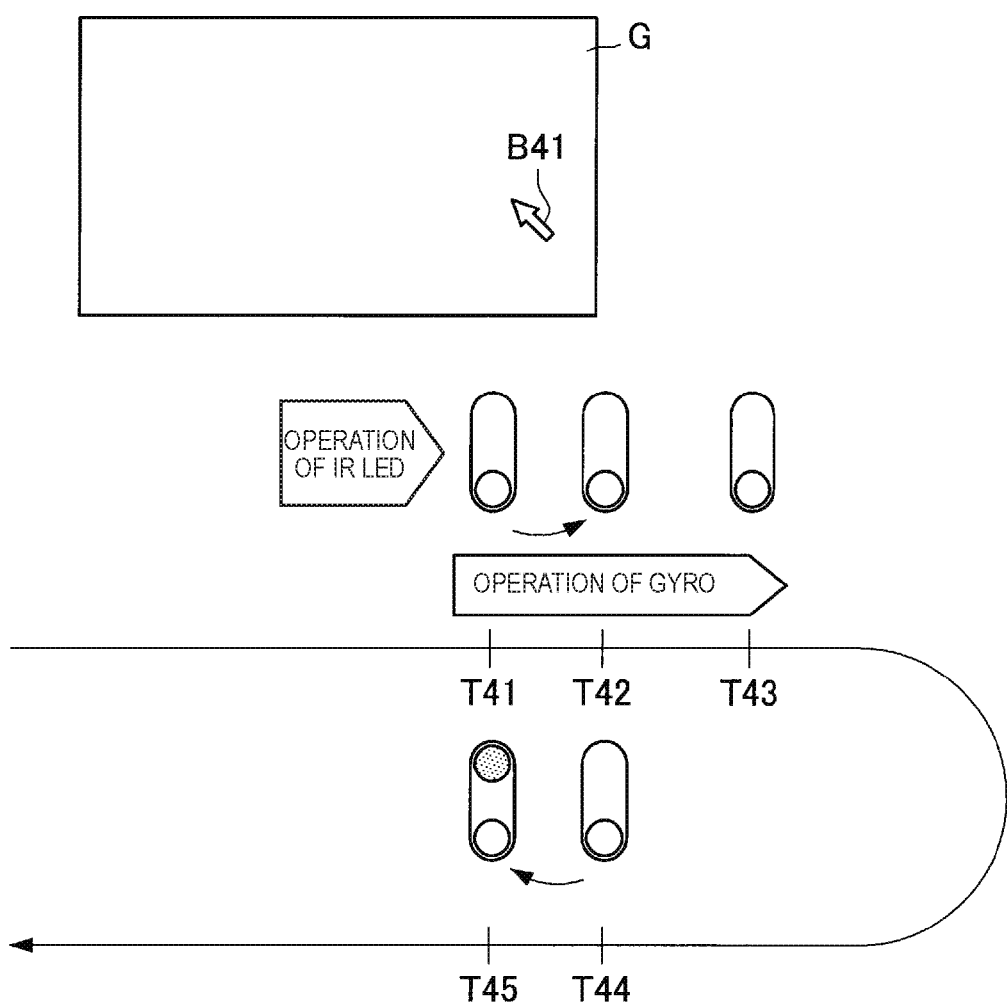
FIG. 13 is a diagram for describing an example of a trigger generation pattern when the position of an image enters the inside of a screen.

The display example of the image when the position of the image enters the inside of the screen has been described above. Next, an example of a trigger generation pattern when the position of an image enters the inside of screen will be described. FIG. 13 is a diagram for describing an example of a trigger generation pattern when the position of an image enters the inside of a screen. The trigger generation pattern can also be applied to any of the first to fourth examples of the trigger generation patterns.

As illustrated in FIG. 13, when the position of the image B41 deviates from the inside of the screen G (times T41 to T43), the calculation unit 114 can calculate the position of a virtual image on an extended plane of the screen G on the basis of an angular velocity detected by the gyro sensor 131. Then, when the position of the image B41 enters the inside of the screen G (time T44), the output control unit 115 detects that the position of the image B41 enters the inside of the screen G as an IR LED ON trigger.

When the IR LED ON trigger is detected, the output control unit 115 outputs an IR LED ON notification to the output device 150. When the output device 150 receives the IR LED ON notification, lighting of the IR LED 151a starts. Thereafter, when the lighting of the IR LED 151a starts and the infrared light thus starts to be radiated so that the infrared light is radiated to the screen G (time T45), a position at which the infrared light is radiated on the screen G is input as an infrared signal to the first input device 120. Then, when the information processing device 110 receives the infrared signal from the first input device 120, the display control unit 116 displays the image B41 at the position to which the infrared light is radiated.

Another example of a trigger generation pattern when the position of an image enters the inside of a screen will be described. The trigger generation pattern is also applied to any of the first to fourth examples of the trigger generation patterns. First, when the position of the image B41 deviates from the inside of the screen G, the output control unit 115 detects that the position of the image B41 deviates from the inside of the screen G as an IR LED ON trigger.

When the IR LED ON trigger is detected, the output control unit 115 outputs an IR LED ON notification to the output device 150. When the output device 150 receives the IR LED ON notification, lighting of the IR LED 151a starts. Thereafter, when the lighting of the IR LED 151a starts and the infrared light thus starts to be radiated, the calculation unit 114 calculates the position of a virtual image on an extended plane of the screen G on the basis of an angular velocity detected by the gyro sensor 131.

Subsequently, when the position of the image B41 enters the inside of the screen, the output control unit 115 detects that the position of the image B41 enters the inside of the screen. On the other hand, a position to which the infrared light is radiated on the screen G is input as an infrared signal to the first input device 120 and the information processing device 110 receives the infrared signal from the first input device 120. The display control unit 116 may display the image B41 at the earlier input position between the position of the image B41 calculated by the calculation unit 114 and the position to which the received infrared light is radiated, and then may correct a deviation between the positions on the basis of the later input position.

The functional details of the information processing system 10 according to the embodiment of the present disclosure have been described above.

<4. Hardware Configuration Example of Information Processing System>

Figure 14:
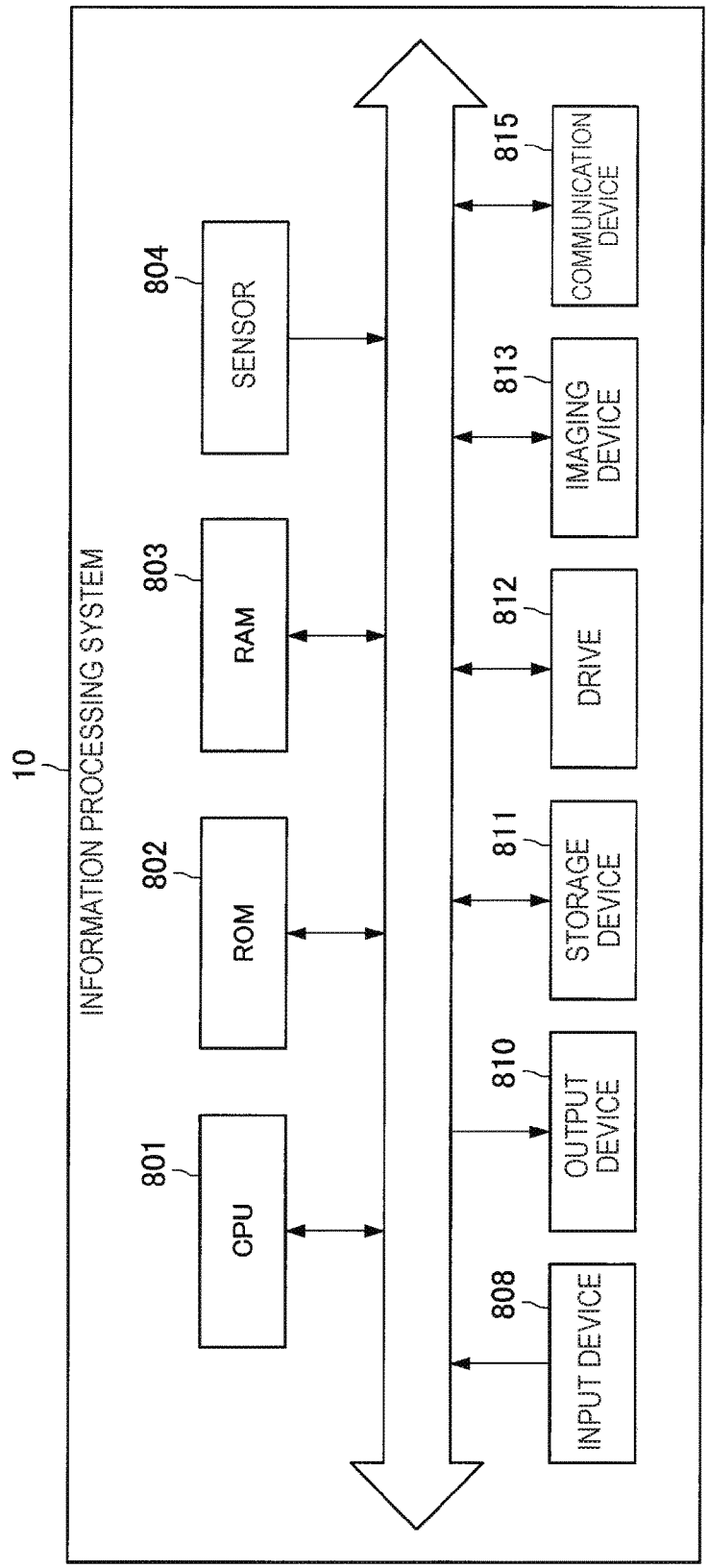
FIG. 14 is a diagram illustrating a hardware configuration example of an information processing system.

Next, a hardware configuration example of the information processing system 10 according to the embodiment of the present disclosure will be described. FIG. 14 is a diagram illustrating a hardware configuration example of an information processing system 10 according to an embodiment of the present disclosure. Here, the hardware configuration example illustrated in FIG. 14 is merely a hardware configuration of the information processing system 10. Accordingly, hardware configuration of the information processing system 10 is not limited to the example illustrated in FIG. 14.

As illustrated in FIG. 14, the information processing system 10 includes a central processing unit (CPU) 801, a read-only memory (ROM) 802, a random access memory (RAM) 803, a sensor 804, an input device 808, an output device 810, a storage device 811, a drive 812, an imaging device 813, and a communication device 815.

The CPU 801 functions as an arithmetic processing device and a control device and controls overall operations in the information processing system 10 in accordance with various programs. Further, the CPU 801 may be a microprocessor. The ROM 802 stores programs, arithmetic parameters, and the like used by the CPU 801. The RAM 803 temporarily store programs used for execution of the CPU 801 or parameters and the like appropriately changed in the execution. These constituent elements are connected to each other by a host bus configured to include a CPU bus.

The sensor 804 includes various detection sensors such as a state detection sensor that detects a state of the information processing system 10 and peripheral circuits. Examples of the sensor 804 include a positioning sensor, an inclination sensor, an acceleration sensor, a gyro sensor, an azimuth sensor, a temperature sensor, a humidity sensor, and an illumination sensor. A signal detected by the sensor 804 is sent to the CPU 801. Thus, the CPU 801 can gain states (a position, an inclination, acceleration, an angular velocity, an azimuth, a temperature, humidity, illumination, and the like) of the information processing system 10.

The input device 808 is configured to include a manipulation unit used for a user to input information, such as a mouse, a keyboard, a touch panel, a button (a power button or the like), a microphone, a switch, a dial and a lever, or the like and an input control circuit that generates an input signal on the basis of an input by the user and outputs the input signal to the CPU 801. The user of the information processing system 10 can input various kinds of data to the information processing system 10 or give an instruction of a processing operation by manipulating the input device 808. In addition, a position at which the manipulation unit is installed is not particularly limited. For example, the manipulation unit may be installed on a side surface of a casing of the information processing system 10 or may be installed on the same surface as a surface on which a display is installed.

The output device 810 may include, for example, a display device such as a liquid crystal display (LCD), an organic light emitting diode (OLED), and a lamp. Furthermore, the output device 810 may include an audio output device such as a speaker and a headphone. For example, the display device displays a captured image, a generated image, or the like. On the other hand, the audio output device converts audio data or the like into audio and outputs the audio.

The storage device 811 is a data storage device configured as an example of the storage unit of the information processing system 10. The storage device 811 may include a storage medium, a recording device that records data on the storage medium, a reading device that reads data from the storage medium, and a deletion device that deletes the data recorded on the storage medium. The storage device 811 stores various kinds of data and programs executed by the CPU 801.

The drive 812 is a reader and writer for a storage medium and is internally or externally attached to the information processing system 10. The drive 812 reads information recorded on a mounted removable storage medium such as a magnetic disk, an optical disc, a magneto-optical disc, or a semiconductor memory and outputs the information to the RAM 803. Further, the drive 812 can write information on a removable storage medium.

The imaging device 813 is a device that images a real space using an image sensor such as a charge coupled device (CCD) or a complementary metal oxide semiconductor (CMOS) and various members such as lenses that control imaging of a subject image in the image sensor and generates a captured image. The imaging device 813 may capture a still image or may capture a moving image.

The communication device 815 communicates with an external device via a network (or directly). The communication device 815 may be an interface for wireless communication and may include, for example, a communication antenna, a radio frequency (RF) circuit, and a baseband processor. A specific example of the interface for wireless communication includes a communication unit such as modem corresponding to a communication scheme such as code division multiple access (CDMA), wideband code division multiple access (W-CDMA), Long Term Evolution (LTE), or wireless fidelity (Wi-Fi) (registered trademark).

Further, the communication device 815 may be an interface for wired communication and may include, for example, a connection terminal, a transmission circuit, and circuits for other communication processes. Further, the CPU 801 and the communication device 815 may be configured by one chip or may be realized as different devices. Further, although not illustrated in FIG. 14, for example, the information processing system 10 may be driven with power supplied from a power supply such as a rechargeable battery. The power supply may be configured to be detachably mounted on the information processing system 10.

The hardware configuration example of the information processing system 10 according to the embodiment of the present disclosure has been described above. For example, the output device 150 and the display device 160 can be realized by the communication device 815 and the output device 810, respectively. Further, the information processing device 110 can be realized by the CPU 801 and the communication device 815. Accordingly, a program causing a computer to function as the information processing system 10 including the information processing device 110 can be retained in the storage device 811, the ROM 802, or the RAM 803. The CPU 801 can execute the program.

<5. Conclusion>

As described above, according to the embodiments of the present disclosure, there is provided the information processing device 100 including the first reception unit 111 configured to receive an infrared signal from the first input device 120, the second reception unit 112 configured to receive an angular velocity from the second input device 130, a calculation unit 114 configured to calculate a position of an image displayed on a screen on the basis of an infrared signal or an angular velocity, and the display control unit 116 configured to display the image at the calculated position.

Here, the calculation unit 114 has the absolute coordinate designation mode in which the position of the image is calculated on the basis of the infrared signal and the relative coordinate designation mode in which the position of the image is calculated on the basis of an angular velocity, and switches a mode from the absolute coordinate designation mode to the relative coordinate designation mode when a user manipulation event is detected in the absolute coordinate designation mode. In this configuration, it is possible to calculate the position of the image displayed on the screen more flexibly, and thus it is possible to obtain the advantageous effects of both the absolute coordinate designation mode and the relative coordinate designation mode.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The example in which the output device 150 is embedded in the remote controller and light is radiated from a position distant from a screen by the remote controller has been described above as an example. However, the output device 150 may be a pen-shaped output device. In this case, a user touches a desired position on a screen with the pen-shaped output device so that a signal can be transmitted from the output device 150 to the first input device 120.

Further, for example, operations of the information processing system 10 may not necessarily performed chronologically in accordance with a procedure described in the flowchart. For example, operations of the information processing system 10 may be performed in a procedure different from the procedure described in the flowchart or at least some of the operations described in the flowchart may be performed in parallel.

Further, a program for causing hardware, such as a CPU, ROM and RAM built into a computer, to exhibit functions similar to the configuration included in the above described information processing system 10 can be created. Further, a recording medium can also be provided which records these programs and is capable of performing reading to the computer.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:
a first reception unit configured to receive a first signal from a first input device;
a second reception unit configured to receive a second signal different from the first signal from a second input device;
a calculation unit configured to calculate a position of an image to be displayed on a screen on the basis of the first or second signal; and
a display control unit configured to display the image at the position,
wherein the calculation unit has a first mode in which the position of the image is calculated on the basis of the first signal and a second mode in which the position of the image is calculated on the basis of the second signal, and switches a mode from the first mode to the second mode when a user manipulation event is detected in the first mode.

(2)

The information processing device according to (1), wherein the first signal is a position of light radiated to the screen.

(3)

The information processing device according to (1), wherein the second signal is a motion detected by a predetermined sensor.

(4)

The information processing device according to (2), wherein the light radiated to the screen includes at least one of infrared light, visible light, and laser light.

(5)

The information processing device according to (3), wherein the motion includes at least one of an angular velocity detected by a gyro sensor, acceleration detected by an acceleration sensor, and a movement amount of a predetermined object recognized through gesture recognition.

(6)

The information processing device according to (2), wherein, in the first mode, the calculation unit decides the position of the light radiated to the screen as the position of the image.

(7)

The information processing device according to (3), wherein, in the second mode, the calculation unit decides a position of a new image by adding a vector on the screen according to the motion to a position of a previous image.

(8)

The information processing device according to any one of (1) to (7), including:
an output control unit configured to output a transmission start request of the first signal to an output device when a transmission start trigger of the first signal is detected, and output a transmission end request of the first signal to the output device when a transmission end trigger of the first signal is detected.

(9)

The information processing device according to (8), wherein the output control unit outputs a transmission start request of the second signal to the second input device when a transmission start trigger of the second signal is detected, and outputs a transmission end request of the second signal to the second input device when a transmission end trigger of the second signal is detected.

(10)

The information processing device according to (9), wherein, as the transmission start trigger of the first signal, the output control unit detects that the second signal is changed.

(11)

The information processing device according to (9), wherein, as the transmission start trigger of the first signal, the output control unit detects that the position of the image deviates from an inside of the screen.

(12)

The information processing device according to (9), wherein, as the transmission start trigger of the first signal, the output control unit detects that a tap manipulation is performed on a touch panel.

(13)

The information processing device according to (9), wherein, as the transmission end trigger of the first signal or the transmission end trigger of the second signal, the output control unit detects that the first signal is received.

(14)

The information processing device according to (9), wherein, as the transmission end trigger of the first signal, the output control unit detects that the second signal is not changed for a predetermined time.

(15)

The information processing device according to (9), wherein, as the transmission start trigger of the second signal, the output control unit detects that a long pressing manipulation is performed on a touch panel.

(16)

The information processing device according to (9), wherein, as the transmission start trigger of the second signal, the output control unit detects that reception of the first signal is stopped.

(17)

The information processing device according to (9), wherein, as a trigger for periodically repeating transmission start and transmission end of the first signal, the output control unit detects that the second signal is changed.

(18)

The information processing device according to any one of (1) to (17),
wherein the display control unit displays the image different between the first and second modes.

(19)

An information processing method including:
receiving a first signal from a first input device;
receiving a second signal different from the first signal from a second input device;
calculating a position of an image to be displayed on a screen on the basis of the first or second signal; and
displaying the image at the position,
wherein a first mode in which the position of the image is calculated on the basis of the first signal and a second mode in which the position of the image is calculated on the basis of the second signal are included, and a mode is switched from the first mode to the second mode when a user manipulation event is detected in the first mode.

(20)

An information processing system including:
a first input device configured to transmit a first signal;
a second input device configured to transmit a second signal different from the first signal; and
an information processing device configured to include
a first reception unit that receives the first signal from the first input device,
a second reception unit that receives the second signal from the second input device,
a calculation unit that calculates a position of an image to be displayed on a screen on the basis of the first or second signal, and
a display control unit that displays the image at the position,
wherein the calculation unit has a first mode in which the position of the image is calculated on the basis of the first signal and a second mode in which the position of the image is calculated on the basis of the second signal, and switches a mode from the first mode to the second mode when a user manipulation event is detected in the first mode.

REFERENCE SIGNS LIST 10 information processing system
110 information processing device
111 first reception unit
112 second reception unit
113 detection unit
114 calculation unit
115 output control unit
116 display control unit
120 first input device
121 image sensor
130 second input device
131 gyro sensor
140 manipulation detection device
141 touch panel
150 output device
151 IR light-emitting device
151a LED
151b fixing base
151c Fresnel lens
151d grip unit
160 display device
161 projector

The invention claimed is:

1. An information processing device, comprising:
a first reception unit configured to receive a first signal from a first input device;
a second reception unit configured to receive a second signal different from the first signal from a second input device;
a calculation unit configured to:
calculate, in a first mode, a position of a first image to be displayed on a screen, based on the first signal;
switch from the first mode to a second mode based on a user manipulation event detected in the first mode; and
calculate, in the second mode, the position of the first image based on the second signal; and
a display control unit configured to control display of the first image at the calculated position on the screen.

2. The information processing device according to claim 1, wherein the first signal is a position of light radiated to the screen.

3. The information processing device according to claim 1, wherein the second signal is a motion detected by a determined sensor.

4. The information processing device according to claim 2, wherein the light radiated to the screen includes at least one of infrared light, visible light, or laser light.

5. The information processing device according to claim 3, wherein the motion includes at least one of an angular velocity detected by a gyro sensor, an acceleration detected by an acceleration sensor, or a movement amount of a determined object recognized through gesture recognition.

6. The information processing device according to claim 2, wherein, in the first mode, the calculation unit is further configured to determine the position of the light radiated to the screen as the position of the first image.

7. The information processing device according to claim 3, wherein, in the second mode, the calculation unit is further configured to determine a position of a new image by addition of a vector on the screen to a position of a previous image, and the addition of the vector is based on the motion.

8. The information processing device according to claim 1, further comprising an output control unit configured to:
output a transmission start request of the first signal to an output device, based on a detection of a transmission start trigger of the first signal; and
output a transmission end request of the first signal to the output device, based on a detection of a transmission end trigger of the first signal.

9. The information processing device according to claim 8, wherein the output control unit is further configured to:
output a transmission start request of the second signal to the second input device, based on a detection of a transmission start trigger of the second signal; and
output a transmission end request of the second signal to the second input device, based on a detection of a transmission end trigger of the second signal.

10. The information processing device according to claim 9, wherein the output control unit is further configured to detect, as the transmission start trigger of the first signal, a change in the second signal.

11. The information processing device according to claim 9, wherein the output control unit is further configured to detect, as the transmission start trigger of the first signal, a deviation of the position of the first image from an inside of the screen.

12. The information processing device according to claim 9, wherein the output control unit is further configured to detect, as the transmission start trigger of the first signal, a tap manipulation on a touch panel.

13. The information processing device according to claim 9, wherein the output control unit is further configured to detect the reception of the first signal as one of the transmission end trigger of the first signal or the transmission end trigger of the second signal.

14. The information processing device according to claim 9, wherein the output control unit is further configured to detect, as the transmission end trigger of the first signal, that the second signal is unchanged for a determined time.

15. The information processing device according to claim 9, wherein the output control unit is further configured to detect, as the transmission start trigger of the second signal, a long pressing manipulation on a touch panel.

16. The information processing device according to claim 9, wherein the output control unit is further configured to detect, as the transmission start trigger of the second signal, that the reception of the first signal is stopped.

17. The information processing device according to claim 9, wherein the output control unit is further configured to detect a change in the second signal as a trigger for periodic repetition of transmission start of the first signal and transmission end of the first signal.

18. The information processing device according to claim 1, wherein the display control unit is further configured to:
   control display of the first image on the screen in the first mode; and
   control display of a second image on the screen in the second mode, wherein the second image is different from the first image.

19. An information processing method, comprising:
   receiving, by a first reception unit, a first signal from a first input device;
   receiving, by a second reception unit, a second signal different from the first signal from a second input device;
   calculating, in a first mode, a position of an image to be displayed on a screen, based on the first signal;
   switching from the first mode to a second mode based on a user manipulation event detected in the first mode;
   calculating, in the second mode, the position of the image based on the second signal; and
   displaying the image at the calculated position on the screen.

20. An information processing system, comprising:
   a first input device configured to transmit a first signal;
   a second input device configured to transmit a second signal different from the first signal; and
   an information processing device, wherein the information processing device includes:
      a first reception unit configured to receive the first signal from the first input device,
      a second reception unit configured to receive the second signal from the second input device,
      a calculation unit configured to:
         calculate, in a first mode, a position of an image to be displayed on a screen, based on the first signal,
         switch from the first mode to a second mode based on a user manipulation event detected in the first mode, and
         calculate, in the second mode, the position of the image based on the second signal, and
      a display control unit configured to control display of the image at the calculated position on the screen.

* * * * *